US010113718B2

(12) United States Patent
Gorman et al.

(10) Patent No.: US 10,113,718 B2
(45) Date of Patent: Oct. 30, 2018

(54) RETROFIT SYSTEM AND METHOD FOR REPLACING LINEAR FLUORESCENT LAMP WITH LED MODULES

(71) Applicants: Aaron Gorman, New Braunfels, TX (US); Gray Lankford, San Antonio, TX (US)

(72) Inventors: Aaron Gorman, New Braunfels, TX (US); Gray Lankford, San Antonio, TX (US)

(73) Assignee: General LED Opco, LLC, San Antonio, TX (US)

( * ) Notice: Subject to any disclaimer, the term of this patent is extended or adjusted under 35 U.S.C. 154(b) by 0 days.

(21) Appl. No.: 15/829,077

(22) Filed: Dec. 1, 2017

(65) Prior Publication Data

US 2018/0087754 A1 Mar. 29, 2018

Related U.S. Application Data

(63) Continuation of application No. 15/643,750, filed on Jul. 7, 2017, which is a continuation of application
(Continued)

(51) Int. Cl.
*F21V 9/00* (2018.01)
*F21V 19/00* (2006.01)
(Continued)

(52) U.S. Cl.
CPC ............. *F21V 19/003* (2013.01); *F21K 9/27* (2016.08); *F21S 4/28* (2016.01); *F21V 15/013* (2013.01);
(Continued)

(58) Field of Classification Search
CPC .. F21K 9/27; F21S 4/28; F21V 15/013; F21V 17/002; F21V 19/003; F21W 2131/405;
(Continued)

(56) References Cited

U.S. PATENT DOCUMENTS 5,848,837 A   12/1998  Gustafson
6,283,612 B1   9/2001  Hunter
(Continued)

FOREIGN PATENT DOCUMENTS

CN   201992387 U   9/2011
CN   203082645 U   7/2013
(Continued)

OTHER PUBLICATIONS

Independence LED Lighting, Eagle LED Tube, accessed at http://independenceled.com/uploads/Independence%20LED%20-%20The%20EAGLE%20LED%20TUBE%20-20Technology%20Differentiation%20-%20Q4%202011.pdf, 2012.
(Continued)

*Primary Examiner* — Stephen F Husar
(74) *Attorney, Agent, or Firm* — William H. Quirk; Jesse Frizzell; Rosenthal Pauerstein Sandoloski Agather LLP

(57) ABSTRACT

A system for replacing linear fluorescent lamps with LED modules in a cabinet sign includes an LED module support structure. The LED module support structure may be attached to the raceways of the cabinet sign or to the sockets formerly used for mounting fluorescent lamps between the raceways.

20 Claims, 14 Drawing Sheets

Related U.S. Application Data

No. 14/694,515, filed on Apr. 23, 2015, now Pat. No. 9,702,531.

(60) Provisional application No. 62/099,722, filed on Jan. 5, 2015, provisional application No. 61/983,140, filed on Apr. 23, 2014.

(51) Int. Cl.

| | |
|---|---|
| *F21V 15/01* | (2006.01) |
| *F21S 4/28* | (2016.01) |
| *F21K 9/27* | (2016.01) |
| *F21W 131/405* | (2006.01) |
| *F21V 17/00* | (2006.01) |
| *F21Y 103/10* | (2016.01) |
| *F21Y 115/10* | (2016.01) |

(52) U.S. Cl.
CPC ...... *F21V 17/002* (2013.01); *F21W 2131/405* (2013.01); *F21Y 2103/10* (2016.08); *F21Y 2115/10* (2016.08); *Y02B 20/386* (2013.01)

(58) Field of Classification Search
CPC . F21Y 2103/10; F21Y 2115/10; Y02B 20/386
See application file for complete search history.

(56) References Cited

U.S. PATENT DOCUMENTS

| | | | |
|---|---|---|---|
| 6,659,623 B2 | 12/2003 | Friend | |
| 6,673,293 B1 | 1/2004 | Mistopoulos et al. | |
| 6,739,734 B1 | 5/2004 | Hulgan | |
| 6,776,504 B2 | 8/2004 | Sloan et al. | |
| 6,796,680 B1 | 9/2004 | Showers et al. | |
| 6,815,724 B2 | 11/2004 | Dry | |
| 6,853,151 B2 | 2/2005 | Leong et al. | |
| 6,860,628 B2 | 3/2005 | Robertson et al. | |
| 6,871,981 B2 | 3/2005 | Alexanderson et al. | |
| 7,052,171 B1 | 5/2006 | Lefebvre et al. | |
| 7,213,941 B2 | 5/2007 | Sloan et al. | |
| 7,441,922 B2 | 10/2008 | Huang et al. | |
| 7,488,086 B2 | 2/2009 | Wu et al. | |
| 7,490,957 B2 | 2/2009 | Leong et al. | |
| 7,507,001 B2 | 3/2009 | Kit | |
| 7,510,299 B2 | 3/2009 | Timmermans et al. | |
| 7,628,505 B2 | 12/2009 | Flaherty | |
| 7,674,016 B2 | 3/2010 | Zhang et al. | |
| 7,828,471 B2 | 11/2010 | Lin | |
| 7,926,977 B2 | 4/2011 | Nall et al. | |
| 7,946,729 B2 | 5/2011 | Ivey et al. | |
| 8,083,373 B2 | 12/2011 | Zimmerman et al. | |
| 8,104,920 B2 | 1/2012 | Dubord | |
| 8,115,411 B2 | 2/2012 | Shan | |
| 8,235,539 B2 | 8/2012 | Thomas et al. | |
| 8,251,541 B2 | 8/2012 | Lin | |
| 8,272,764 B2 | 9/2012 | Son | |
| 8,287,144 B2 | 10/2012 | Pederson et al. | |
| 8,308,320 B2 | 11/2012 | Tickner et al. | |
| 8,360,608 B2 | 1/2013 | Wilder | |
| 8,419,223 B2 | 4/2013 | Withers | |
| 8,454,193 B2 | 6/2013 | Simon et al. | |
| 8,474,998 B2 | 7/2013 | Wang et al. | |
| 8,579,463 B2 | 11/2013 | Clough | |
| 8,616,730 B2 | 12/2013 | Edwards, Jr. et al. | |
| 8,746,907 B2 | 6/2014 | Nakamura et al. | |
| 8,791,650 B2 | 7/2014 | Shan | |
| 8,905,579 B2 | 12/2014 | Dobbins et al. | |
| 8,956,006 B2 | 2/2015 | Buelow et al. | |
| 8,956,013 B1 | 2/2015 | Shew | |
| 9,062,867 B2 | 6/2015 | Rodgers et al. | |
| 9,133,986 B2 | 9/2015 | Wang et al. | |
| 9,163,794 B2 | 10/2015 | Simon et al. | |
| 9,179,513 B2 | 11/2015 | Shan | |
| 9,188,290 B2 | 11/2015 | Lay et al. | |
| 9,228,727 B2 | 1/2016 | May | |
| 9,243,759 B2 | 1/2016 | Lin et al. | |
| 9,267,650 B2 | 2/2016 | Simon et al. | |
| 9,416,923 B1 | 2/2016 | Timmermans et al. | |
| 9,285,088 B2 | 3/2016 | Rofles et al. | |
| 9,301,416 B2 | 3/2016 | Zaderej et al. | |
| 9,851,054 B2 | 12/2017 | Vincent | |
| 2006/0002110 A1 | 1/2006 | Dowling et al. | |
| 2007/0228999 A1 | 10/2007 | Kit | |
| 2007/0268698 A1 | 11/2007 | Chen et al. | |
| 2008/0291688 A1* | 11/2008 | Higashi | ............... F21S 48/1159 362/516 |
| 2009/0091929 A1 | 4/2009 | Faubion | |
| 2010/0103673 A1 | 4/2010 | Ivey et al. | |
| 2010/0148673 A1 | 6/2010 | Stewart et al. | |
| 2010/0172149 A1 | 7/2010 | Siemiet et al. | |
| 2010/0289428 A1 | 11/2010 | Frazier et al. | |
| 2010/0321921 A1 | 12/2010 | Ivey | |
| 2011/0084608 A1 | 4/2011 | Lin et al. | |
| 2011/0156591 A1 | 6/2011 | Lin | |
| 2011/0309745 A1 | 12/2011 | Westermarck et al. | |
| 2011/0317421 A1 | 12/2011 | So | |
| 2012/0124874 A1* | 5/2012 | Breihof | ................... G09F 13/04 40/564 |
| 2012/0236533 A1 | 9/2012 | Nakamura et al. | |
| 2013/0050997 A1 | 2/2013 | Bretschneider et al. | |
| 2013/0265746 A1 | 10/2013 | May | |
| 2014/0078731 A1 | 3/2014 | Harruff | |
| 2014/0268785 A1 | 9/2014 | Quaal et al. | |
| 2014/0292198 A1 | 10/2014 | Sanders et al. | |
| 2015/0184807 A1* | 7/2015 | Vincent | ..................... F21K 9/17 362/223 |
| 2015/0211688 A1 | 7/2015 | Shan | |
| 2016/0369950 A1 | 12/2016 | Yeager | |

FOREIGN PATENT DOCUMENTS

| | | |
|---|---|---|
| JP | 20030096284 A | 10/2004 |
| JP | 2004335426 A | 11/2004 |
| JP | 2010212360 A | 9/2010 |
| KR | 20080056451 B1 | 7/2009 |
| KR | 20110050060 A | 5/2011 |
| KR | 101579220 B | 10/2011 |
| WO | 2011074884 A2 | 6/2011 |
| WO | 2011124504 A1 | 10/2011 |
| WO | 2012032454 A1 | 3/2012 |
| WO | 2012114096 A1 | 8/2012 |

OTHER PUBLICATIONS

LED Green Light, "LED Tube Light Retrofit Kit for GL-T8A-4FT20 CM(D) Installation Information & Instructions", Jul. 1, 2012, accessed at http://www.ledgreenlightint.com/uploads/1/3/7/2/13728273/led_tube_light_retrofit_instructions_for_gl-t8a-4ft20_cmd-2012.pdf.

LEDs Magazine, Jul./Aug. 2013, pp. 17, 29, accessed at http://www.ledsmagazine.com/content/dam/leds/past-issues/2013/07/1307LEDS.pdf.

Yimin Gu and Nadarajah Narendran, "Design and Evaluation of an LED-based Light Fixture", Third International Conference on Solid State Lighting, Proceedings of SPIE 5187: 318-329, 2004.

Globaldata, "Gree, Inc. (CREE)—Alternative Energy—Deals and Allliances Profile", Jun. 2013, accessed at https://dialog.proquest.com/professional /docview/1401107236?accountid=157282.

Chen Nan and Wang Jianjing, "Final Report: A driving technology for retrofit LED lamp for fluorescent lighting fixtures with electronic ballasts", Institute of Electrical and Electronics Engineers, Aug. 12, 2010.

Thomas & Betts/Emergi-Lite, "Full Range of Emergency Lighting Solutions" catalog, pp. 28, 30, 2013.

Peter B. Green, "LED Replacements for Fluorescent Tubes", Power Magazine, 2012, pp. 23-25, accessed at http://www.power-mag.com/pdf/feature_pdf/1330614008_IR_Cover Story_Layout_1.pdf.

Neptun Light, Installation Instructions 88000-LED Series—T8 Tubes (Single Pole), 2012, accessed at https://www.google.com/url?sa=t&rct=j&q=&esrc=s&source=web&cd=3&cad=rja&uact=8&ved=

(56) References Cited

OTHER PUBLICATIONS

0ahUKEwjjh5DRsdnYAhXhT98KHXHqBDUQFgg0MAI&url=
http%3A%2F%2Fwww.neptunlight.com%2Fblobs%2F9%
2F99d8c6fff93ee769e73480cefbd0c955%2FNeptun-T8-LED-
Installation-Instruction-1Pole.pdf&usg=AOvVaw2e07N3kJoSyD-
CDt24_FZR.
Wen-Tsai Sung and Jia-Syun Lin, "Design and Implementation of a Smart LED Lighting System Using a Self Adaptive Weighted Data Fusion Algorithm", Dec. 6, 2013, pp. 16915-16939, vol.13, Sensors.
Principal LED, Qwik Stik Series data sheet + Vincent Affidavit, Jan. 2017.

* cited by examiner

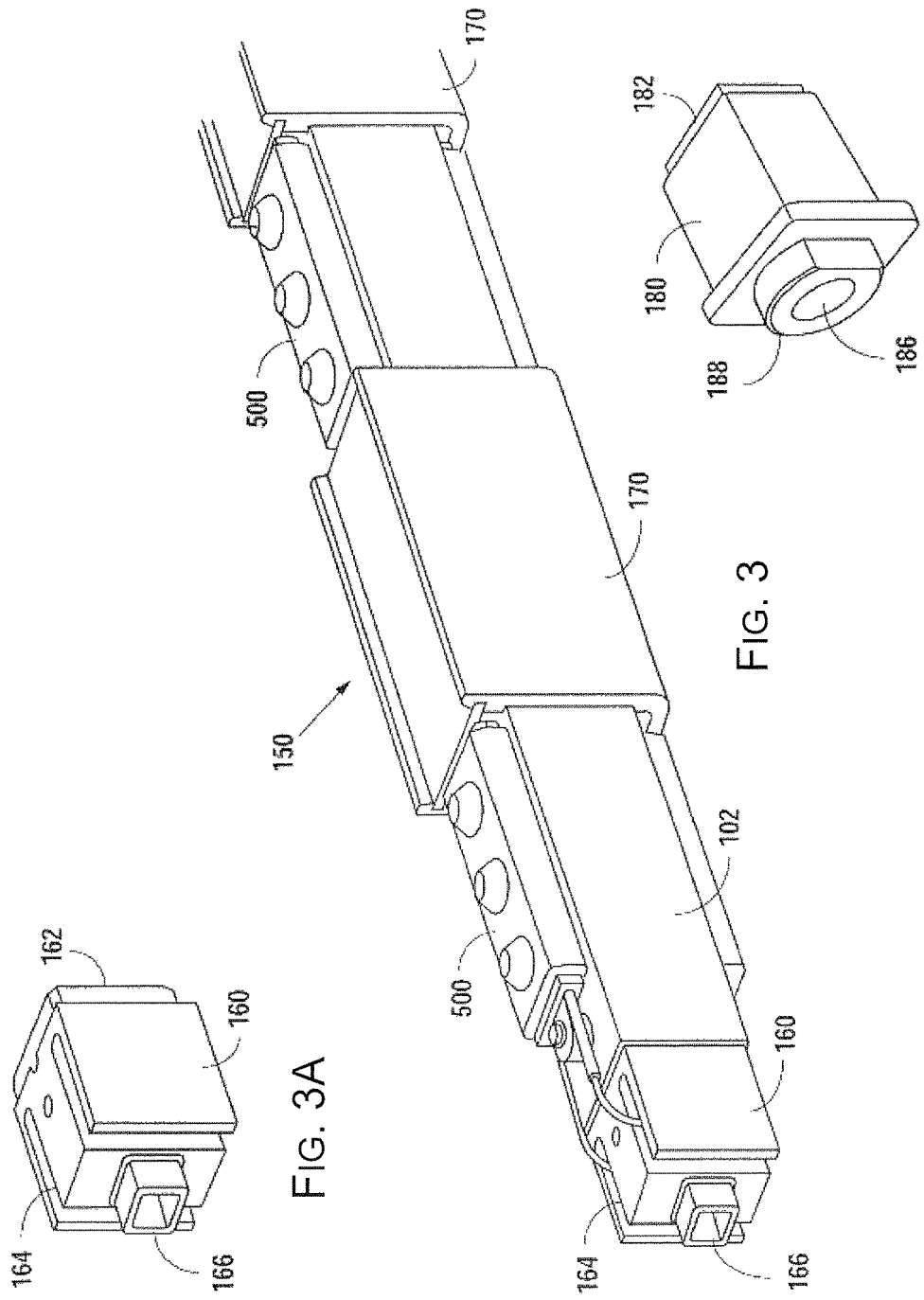

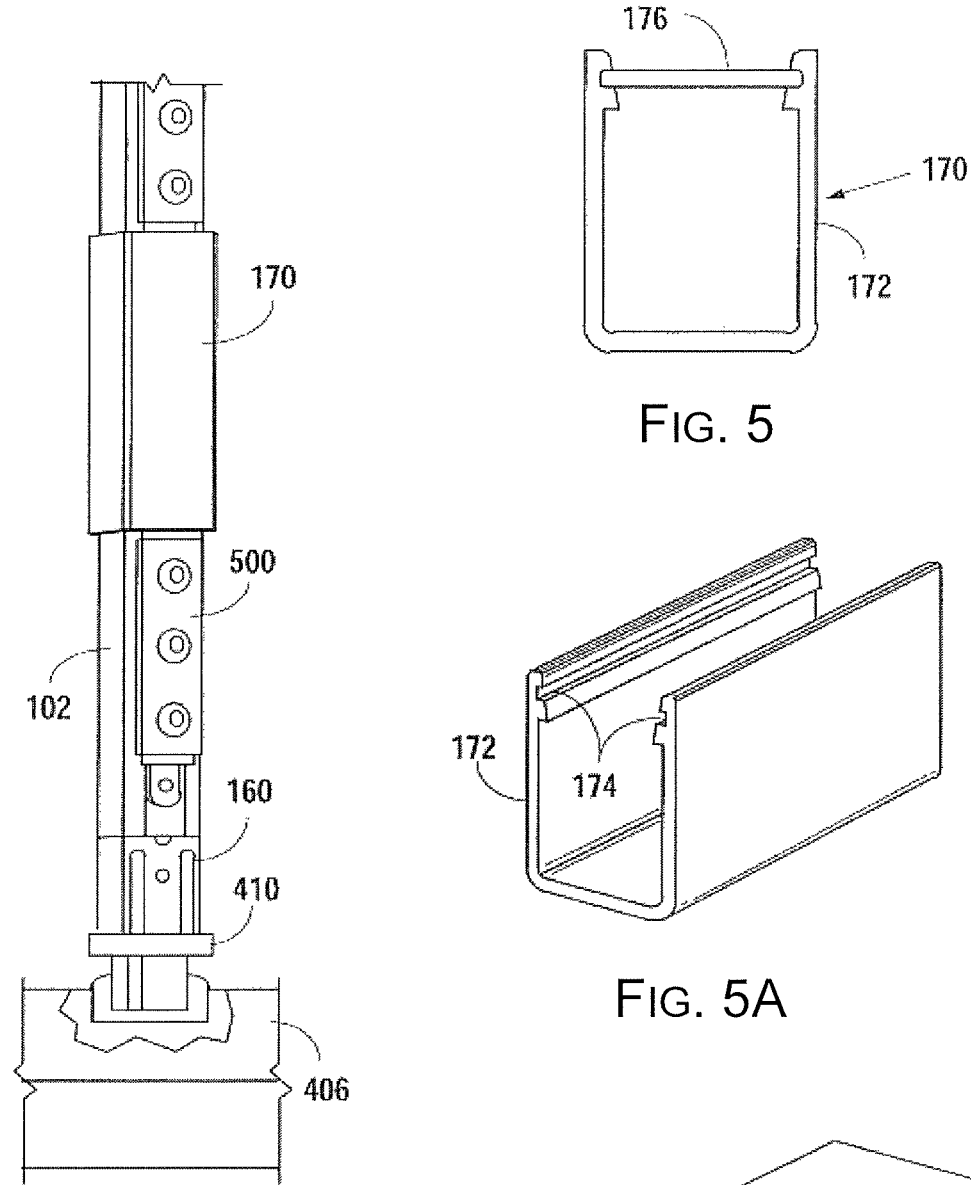
FIG. 4
FIG. 5
FIG. 5A
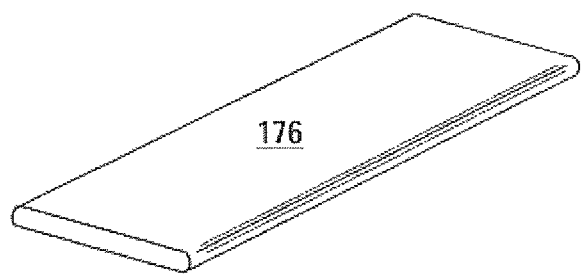
FIG. 5B

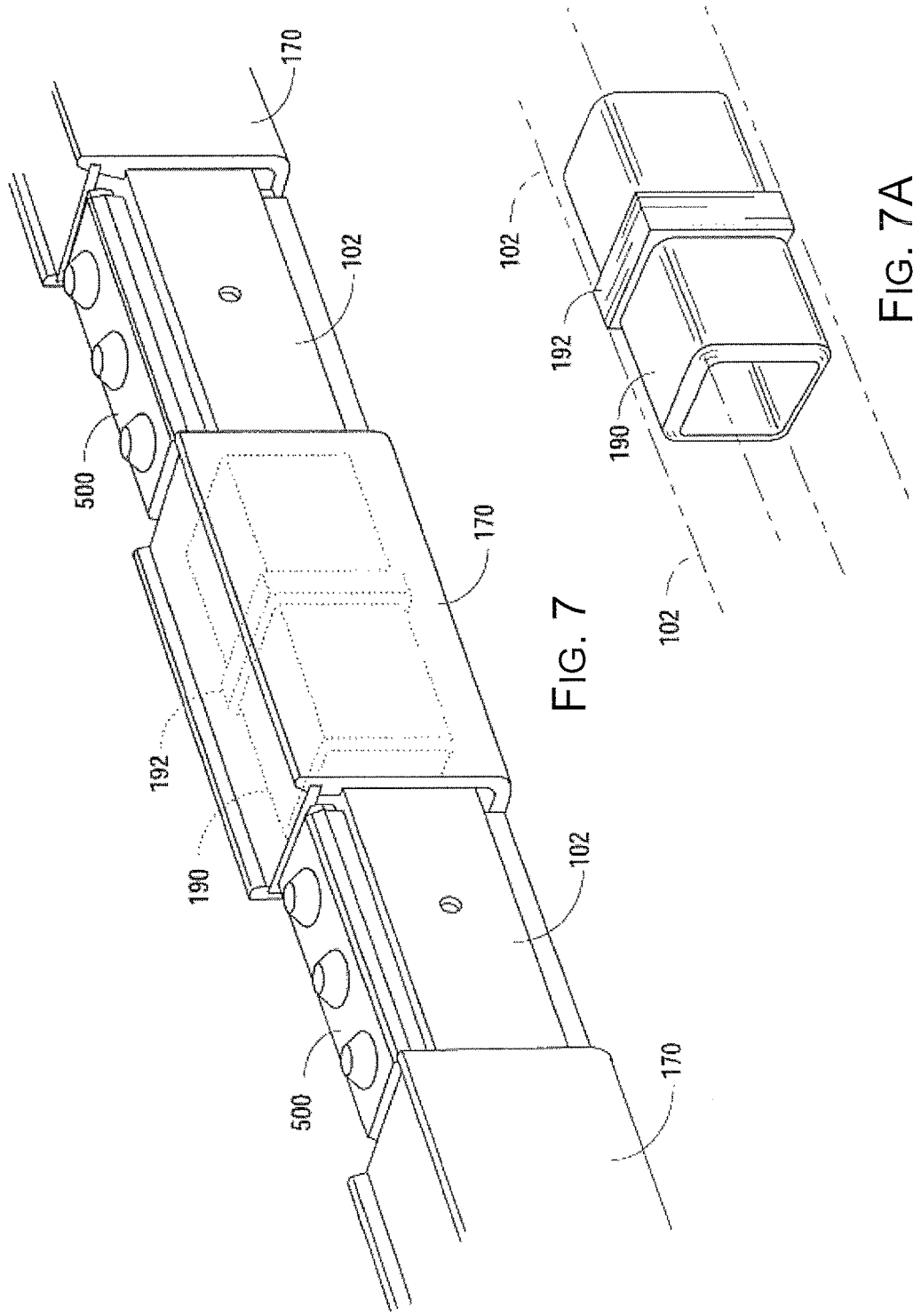

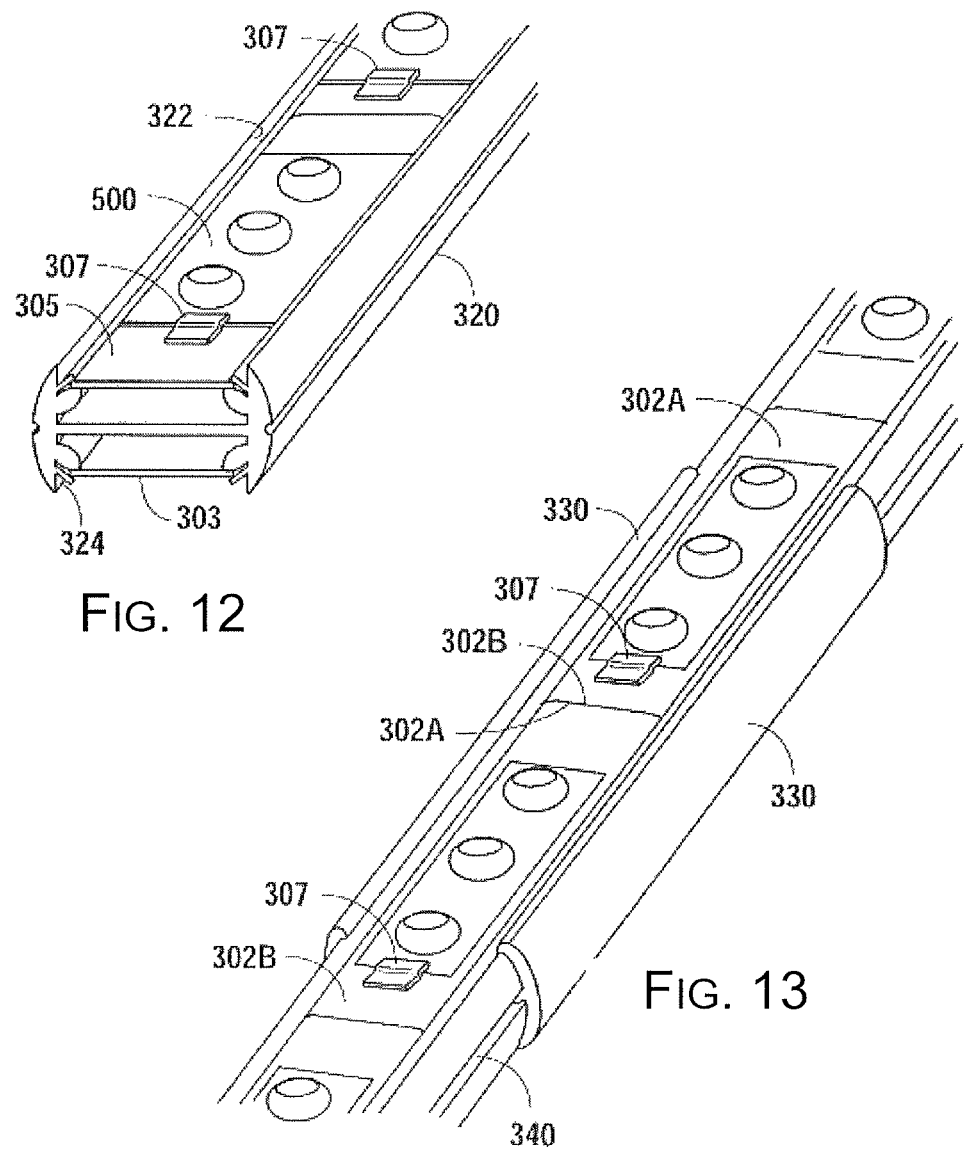
FIG. 12
FIG. 13
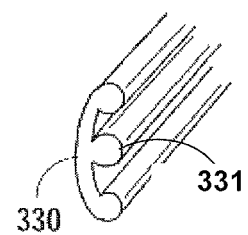
FIG. 13A

RETROFIT SYSTEM AND METHOD FOR REPLACING LINEAR FLUORESCENT LAMP WITH LED MODULES

CROSS REFERENCE TO RELATED PATENT APPLICATIONS

This application is a continuation of prior filed U.S. Non-Provisional patent application Ser. No. 15/643,750, filed on Jul. 7, 2017, which is a continuation of prior filed U.S. Non-Provisional patent application Ser. No. 14/694,515, filed on Apr. 23, 2015, which has issued as U.S. Pat. No. 9,702,531, issuing on Jul. 11, 2017, which claims the benefit of U.S. Provisional Patent Application Ser. No. 62/099,722 filed on Jan. 5, 2015 and U.S. Provisional Patent Application Ser. No. 61/983,140 filed on Apr. 23, 2014. By this reference, the entire disclosures, including the claims and drawings, of U.S. Non-Provisional patent application Ser. No. 15/643,750, U.S. Pat. No. 9,702,531, and U.S. Provisional Patent Application Ser. Nos. 62/099,722 and 61/983,140, are hereby incorporated in the present disclosure as if set forth in their entirety.

FIELD

The present invention pertains to the mounting of LED light systems; more particularly, the present invention pertains to systems and methods for replacing linear fluorescent lamps in cabinet signs with LED modules.

BACKGROUND

Linear fluorescent lamps have been the light source of choice for commercial applications, to include signage, in the United States and other countries for much of the twentieth century. The many types of linear fluorescent lamps currently range from a nominal size of less than one foot to a nominal size of ten feet. Because of the many standard sizes of linear fluorescent lamps in commercial lighting, commercial signage is designed around the nominal length of the linear fluorescent lamps.

In commercial signage, linear fluorescent lamps are often mounted in a parallel fashion in what is known in the industry as cabinet signs. The structure of the interior of the prior art cabinet signs provides mounting points, typically the two fluorescent lamp sockets, between which each linear fluorescent lamp is placed. The two sockets both hold the linear fluorescent lamps in position and enable a female electrical connection to the prongs which extend outwardly from the ends of the linear fluorescent lamps. To accommodate small variations in the lengths of linear fluorescent lamps, one of the sockets, typically the socket at the top of the cabinet sign, includes a spring to assure that the linear fluorescent lamp is held in place and that a suitable electrical connection is established.

While it is generally cheaper to operate linear fluorescent lamps than the incandescent light bulbs that linear fluorescent lamps replaced, the continuing increases in the cost of electrical energy have resulted in the need for a source of light energy that is cheaper to operate and more reliable than linear fluorescent lamps.

Several decades ago LEDs became available as a lighting source. Initially, the low-light output of LEDs limited their use to indicator lights typically used with electronic control systems. Since the initial introduction of LEDs, their output of light energy has increased to where the light output of LEDs rivals the light output of both incandescent light bulbs and linear fluorescent lamps. In addition to being less expensive to operate than linear fluorescent lamps, LEDs have a much longer life; thus, the operational cost of LEDs per unit of time is much less than systems using conventional linear fluorescent lamps.

LEDs also provide other features not found in systems using linear fluorescent lamps. Those features include color and flexibility. Most linear fluorescent lamps emit white or off-white illumination. LEDs emit light in multiple colors. Further, LEDs are typically provided in modules, which LED modules are connected one to another by wires. Thus, for commercial lighting designers, LEDs provide more flexibility and less cost over time.

Since fluorescent lighting has been around for more than half a century, there are many cabinet signs designed for fluorescent lamps which are still serviceable and will remain serviceable for many years to come. Rather than building entirely new signage structures for the use of LED lights, the need has developed in commercial lighting applications for a system and method to replace linear fluorescent lamps with LED modules in existing prior art cabinet signs designed and built for the mounting of linear fluorescent lamps.

SUMMARY

The disclosed system and method for replacing linear fluorescent lamps with LED modules in existing prior art cabinet signs designed and built for the mounting of linear fluorescent lamps in sockets between raceways includes an LED module support structure. The LED module support structure may be attached to the raceways within the prior art cabinet signs or to the fluorescent lamp sockets mounted in the raceways.

In one embodiment, the LED module support structure is a hollow extrusion which may be directly attached to the raceways within the prior art cabinet sign. In another embodiment, the hollow extrusion LED module support structure may be connected to the raceways within the prior art cabinet sign with a three-sided connector. In yet another embodiment, the hollow extrusion LED module support structure is used to engage the sockets formerly used to support and provide electrical power to the linear fluorescent lamps.

In still another embodiment, the LED module support structure is an extrusion having a cross section including flanges, a single or double web therebetween and a central opening formed in the web. The extrusion may be directly attached to the raceways, connected to the raceways with a three-sided connector or formed to engage one or both of the sockets formerly used to support and provide electrical power to the linear fluorescent lamps.

In still yet another embodiment the LED modules support structure is a pair of substantially flat strips positioned in a substantially H-shaped holder. One end of the pair of substantially flat strips is formed into a grappling yoke for frictional engagement with the sides of the raceway.

BRIEF DESCRIPTION OF THE DRAWING FIGURES

A better understanding of the disclosed system for replacing linear fluorescent lamps in a cabinet sign may be had by reference to the drawing figures wherein:

FIG. 3 is a perspective view of the bottom of a second version of the first embodiment;

FIG. 3A is a perspective view of an adapter shown in FIG. 3;

FIG. 3B is a perspective view of an alternate embodiment of the adapter shown in in FIG. 3A;

FIG. 4 is a perspective view of the embodiment shown in FIG. 3 showing engagement with a fluorescent lamp socket;

FIG. 5 is a side elevational view of a wire cover which fits over the extruded hollow LED module support structure;

FIG. 5A is a perspective view of the U-shaped portion of the wire cover shown in FIG. 5;

FIG. 5B is a perspective view of the plate shown in FIG. 5;

FIG. 7 is a perspective view of the connection of two sections of the extruded hollow LED module support structure;

FIG. 7A is a perspective view of the block used in FIG. 7;

FIG. 12 is a perspective view in partial section showing the LED module support structure;

FIG. 13 is a perspective view of two sections of the LED module support structure connected one to another; and FIG. 13A is a perspective view of the extender shown in FIG. 13.

DESCRIPTION OF THE EMBODIMENTS

A better understanding of the disclosed system and method may be had from an understanding of prior art cabinet signs in which linear fluorescent lamps provide illumination behind one or two translucent panels. The translucent panels are typically mounted in a frame whose dimensions are determined primarily by the length of the linear fluorescent lamps used in the prior art cabinet signs.

Figure 1:
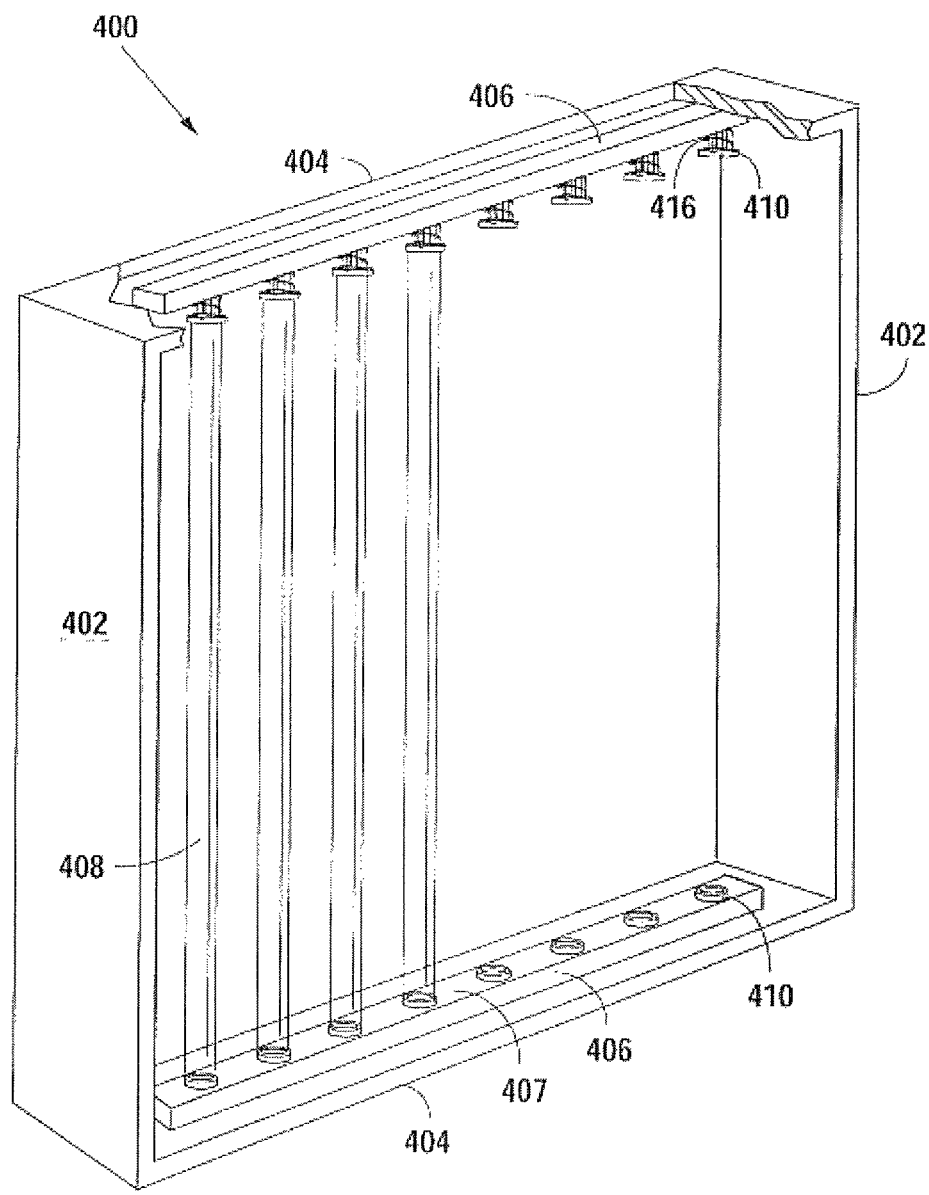
FIG. 1 is a perspective view of a prior art cabinet sign designed for the use of linear fluorescent lamps as an illumination source.

Shown in FIG. 1 is a perspective view of a prior art cabinet sign 400 with the translucent panels removed. Structurally, the illustrated cabinet sign 400 has two side walls 402 and two end walls 404 which hereinafter will both be described as end walls. In some prior art cabinet signs, the linear fluorescent lamps are mounted substantially horizontally, and in other prior art cabinet signs the linear fluorescent lamps are mounted substantially vertically as shown by the four linear fluorescent lamps 408 on the left side of FIG. 1. Attached to the end walls 404 are raceways 406 which contain fluorescent lamp sockets 410.

The fluorescent lamp sockets 410 both physically mount and provide electrical energy to the linear fluorescent lamps 408. As shown in FIG. 1 the fluorescent lamp sockets 410 at the bottom of the cabinet sign 400 are affixed to the raceway 406. However, the fluorescent lamp sockets 410 in the raceway 406 at the top of the cabinet sign 400 include a movable, spring bias 416 mounting. This is because the lengths of all linear fluorescent lamps are not exactly the same and some movement must be provided for this variation in length.

As will be explained below, when converting a prior art cabinet sign 400, which was previously illuminated by linear fluorescent lamps, to a sign illuminated by LED modules, the raceways 406 will be left in place.

Figure 2:
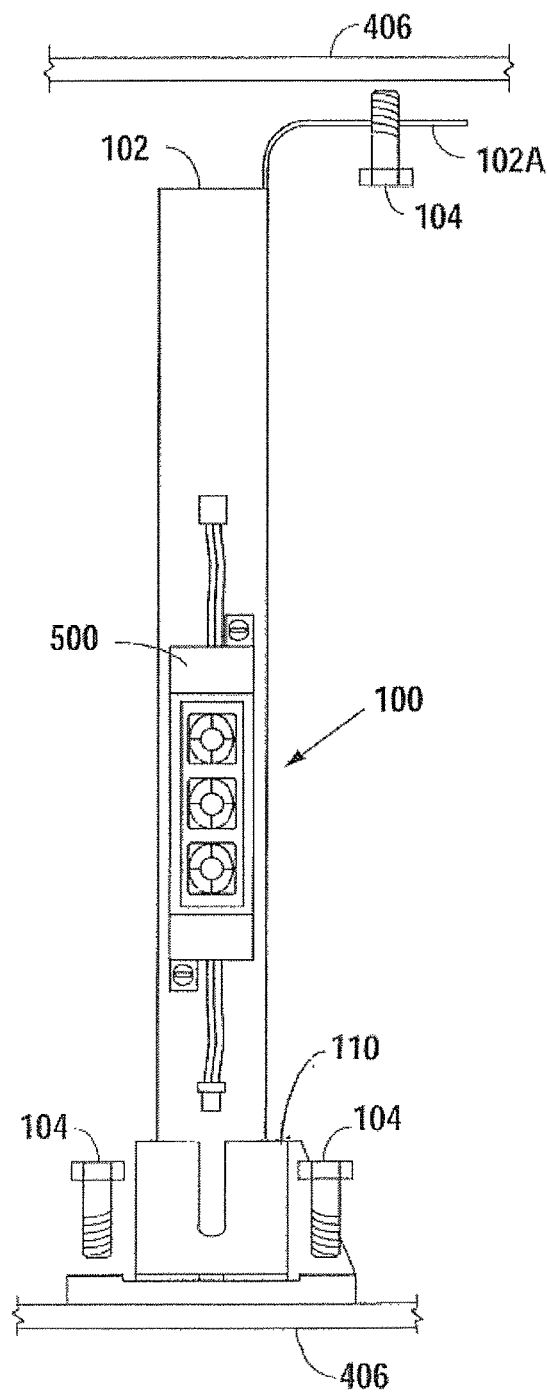
FIG. 2 is a side elevational view of a first embodiment of the disclosed system.
Figure 2A:
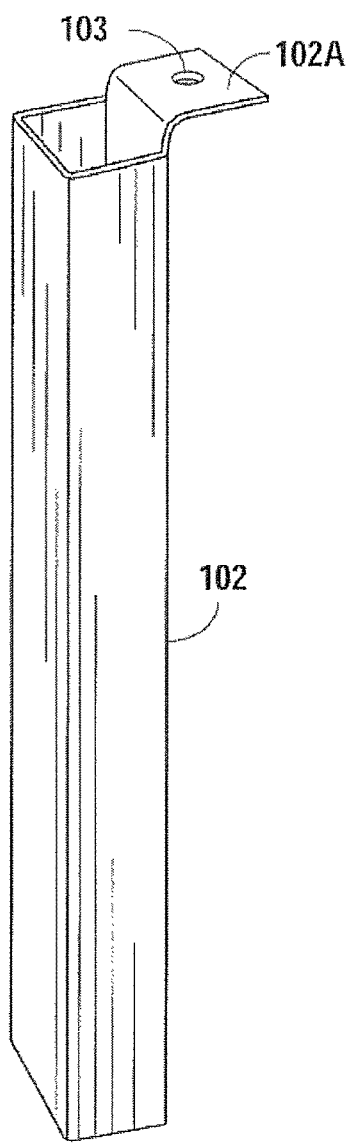
FIG. 2A, FIG. 2B and FIG. 2C are perspective views of the extruded hollow LED module support structure showing mounting tabs formed on the ends thereof.

Shown in FIG. 2 is a first embodiment 100 of the disclosed system. Herein, both raceways 406 have been left in place. The main structural portion of the first embodiment is an extruded hollow LED module support structure 102 which is cut substantially to the length of the linear fluorescent tube that will be replaced. As shown in FIG. 2A, the extruded hollow LED module support structure 102 is preferably a substantially square extrusion; however, an extrusion having a rectangular cross section or a cross section in the shape of a parallelogram may also be used. The generic term used herein for the geometry of these cross sections is a parallelepiped. LED modules 500 are connected to the extruded hollow LED module support structure 102 as shown in FIG. 2.

Also shown in FIG. 2A is that three walls of the extruded hollow LED module support structure 102 may be removed to leave a mounting tab 102A. This mounting tab 102A is shown at the top of FIG. 2. Herein, a hole 103 is formed the in the mounting tab 102 and a threaded fastener 104 can be used to secure the tab 102 to the raceway 406 of the cabinet sign 400 in that part 407 (FIG. 1) of the raceway 406 between the sets of fluorescent lamp sockets 410.

Figure 2B:
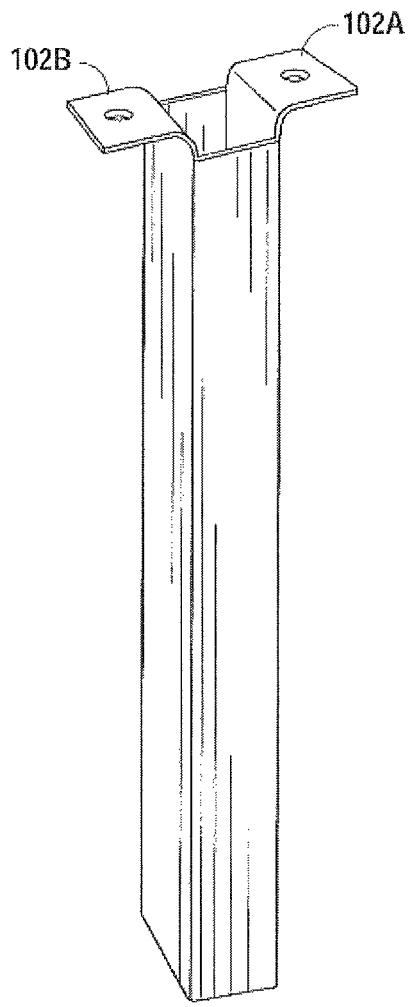
Figure 2C:
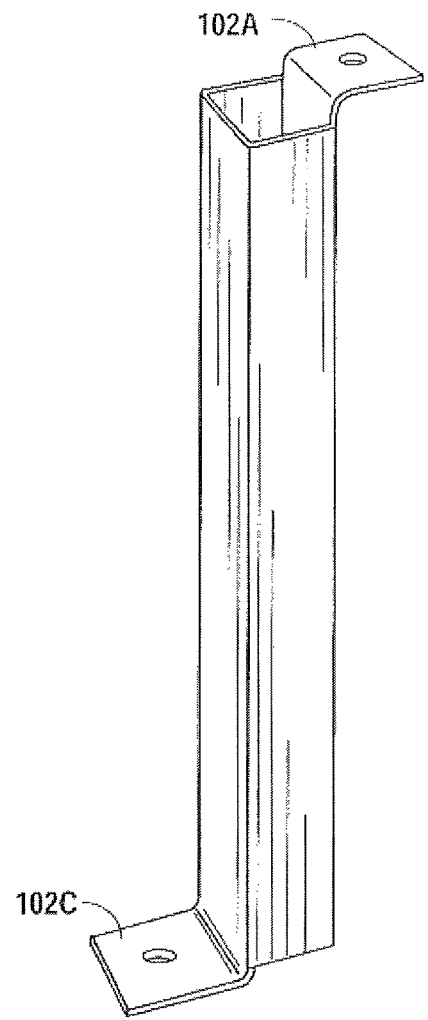

If desired, two mounting tabs 102A, 102B may be formed at the end of the extruded hollow LED module support structure 102 as shown in FIG. 2B. Alternatively, a mounting tab 102A, 102C may be formed at each end of the extruded hollow LED module support structure 102 as shown in FIG. 2C.

Figure 2D:
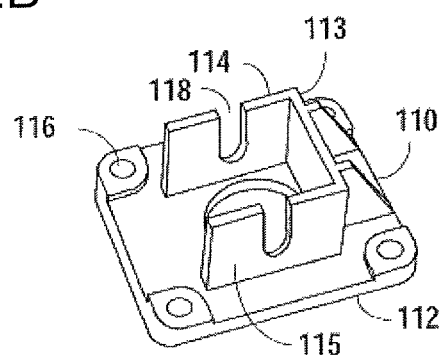
FIG. 2D is a perspective view of the three-sided connector shown in FIG. 2.

Shown in FIG. 2, the upper end of the extruded hollow LED module support structure 102 is connected to the raceway 406 of the cabinet sign 400 using a mounting tab 102A and a threaded fastener 104. The bottom of the extruded hollow LED module support structure 102 may be positioned on top of the raceway 406 with a three-sided connector 110 as shown in FIG. 2D. The three-sided connector 110 is attached to the top of the raceway 406 with threaded fasteners which pass through holes 116 formed in the base portion 112 of the three-sided connector 110. Slots 118 in two sides 114, 115 of the three sides 113, 114, 115 of three-sided connector 110 enable securing the extruded hollow LED module support structure 102 to the three-sided connector 110 with a threaded fastener if desired.

Shown in FIG. 3 is a second version 150 of the first embodiment 100 using a substantially square hollow extrusion 102. As indicated above, the raceway 406 and the fluorescent lamp sockets 410 contained therein may be left in the cabinet sign 400. The second version 150 of the first embodiment 100 connects to the interior portion of the fluorescent lamp sockets 410 which remain in the raceway 406 to engage the extruded hollow LED module support structure 102 as shown in FIG. 4.

As in the first version of the first embodiment 100, the main structural portion is a substantially square extruded hollow LED module support structure 102. As shown in FIG. 3, at the bottom end is an adapter 160 having a portion 162 which fits into the hollow portion of the extruded hollow LED module support structure 102, as shown in FIG. 3A. At the other end of the adapter 160 is a substantially rectangular opening 166. This substantially rectangular opening 166 is sized to fit around the protrusion found in the center of fluorescent lamp sockets 410. Along the sides of the adapter 160 shown in FIG. 3A are wire channels 164 for the wires which provide electrical energy to the LED modules 500 mounted on the sides of the extruded hollow LED module support structure 102. The engagement of the adapter 160 shown in FIG. 3A with the interior of the fluorescent lamp socket 410 is shown in FIG. 4.

Shown in FIG. 36 is an alternate shape for the adapter 180 which may be used to fit into the hollow portion of hollow LED module support structure 102. Like the adapter 160 shown in FIG. 3A, there is a portion 182 which engages the hollow portion of the hollow LED module support structure 102. On the opposite end is an opening 186 to accommodate the protrusion found in the interior of a fluorescent lamp socket 410. Surrounding the opening 186 is a substantially D-shaped form 188 which may be used to fit within the D-shaped opening found in the interior of some fluorescent lamp sockets 410.

Also shown in second version 150 of the first embodiment 100 in FIG. 3 is a sleeve assembly 170 which both covers the wires extending between the LED modules 500 and holds the LED modules 500 to the extruded hollow LED module support structure 102. The construction of this sleeve assembly 170 is shown in FIG. 5. Surrounding three sides of the extruded hollow LED module support structure 102 is a substantially U—shaped portion 172. Shown in FIG. 5A are the channels 174 formed on the top portion of the substantially U-shaped portion 172. These channels 174 enable the plate 176 shown in FIG. 5B to slide therein to cover the wires between the LED modules 500.

Figure 6:
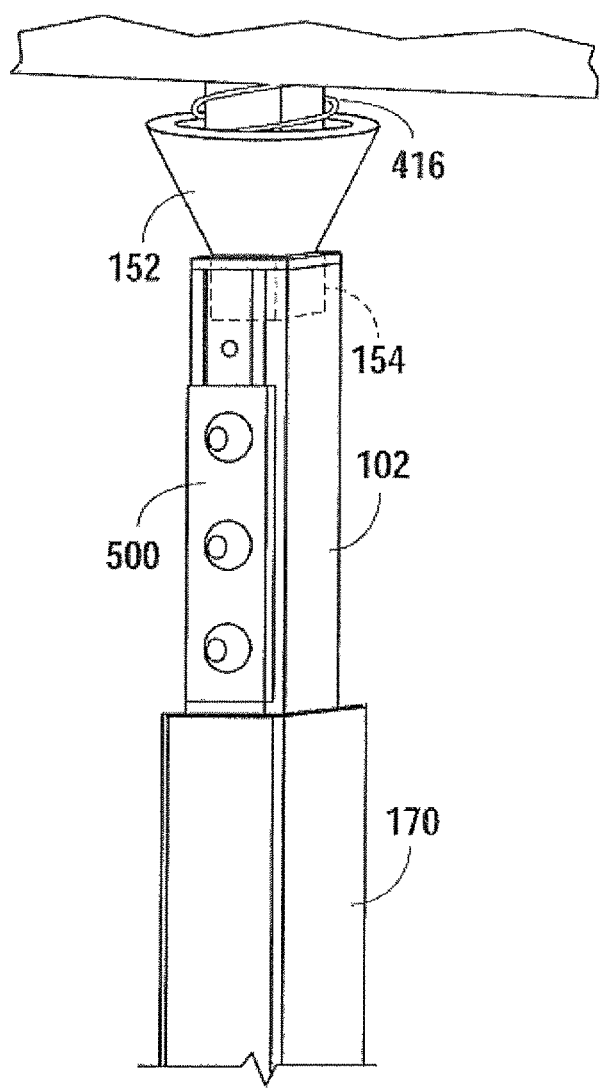
FIG. 6 is a perspective view of the top of the embodiment shown in FIG. 3.
Figure 6A:
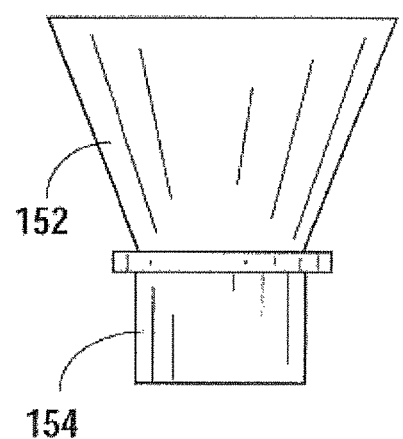
FIG. 6A is a side elevational view of the substantially hollow conical connector shown in FIG. 6.

The top end of the second version 150 of the first embodiment 100 is shown in FIG. 6. Therein a substantially hollow cone 152 is used to contact the outer portion of the fluorescent lamp socket 410. The substantially hollow cone 152 is connected to the extruded hollow LED module support structure 102 in the same way as the adapters 160 shown in FIG. 3A and FIG. 3B. Specifically, a block portion 154, as shown in FIG. 6A, is inserted into the hollow portion of the extruded hollow LED module support structure 102.

Those of ordinary skill in the art will understand that the extruded LED module support structure 102 may be attached to the raceways 406 using mounting tabs, or a three-sided connector 110 such as shown in FIG. 2D. Alternatively, the extruded hollow LED module support structure 102 may engage the interior of a fluorescent lamp socket 410 using an adapter 160 as shown in FIG. 3A or adapter 180 as shown in FIG. 3B. Also, the extruded hollow module support structure 102 may engage the exterior of a fluorescent lamp socket using a hollow cone 152 as shown in FIG. 6A.

In some prior art cabinet signs, an extremely long linear fluorescent lamp may have been used. Herein it may be necessary to use to multiple sections of the extruded hollow LED module support structure 102. If so, a structure as shown in FIG. 7 is employed. Inserted into the hollow portion of each section of the extruded hollow LED module support structures 102 is a block 190 as shown in FIG. 7A. In the center section of the block 190 is central portion 192 whose outside perimeter substantially matches the outside perimeter of the extruded hollow LED module support structure 102. For additional strength, it has been found that the sleeve assembly 170, shown in FIG. 5, may be placed around each end of the extruded hollow LED module support structure 102 sections and the block 190 therebetween.

Figure 8:
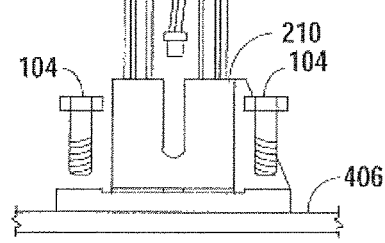
FIG. 8 is a side elevational view of the second embodiment of the disclosed system.

The second embodiment 200 of the disclosed system shown in FIG. 8 is similar to the first embodiment of the disclosed system shown in FIG. 2 but for the cross section of the extruded hollow LED module support structure 102 which is a substantially square or rectangular extrusion in the first embodiment 100.

Figure 8A:
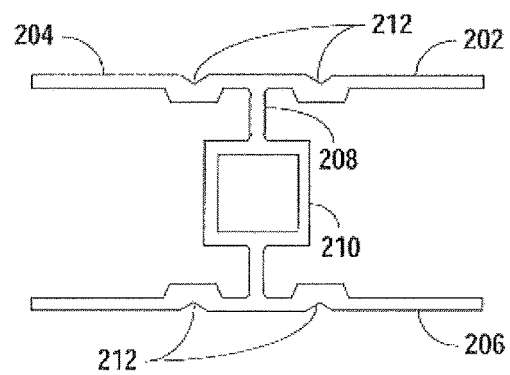
FIG. 8A is a perspective view of one version of the extruded hollow LED module support structure used in the second embodiment.
Figure 8B:
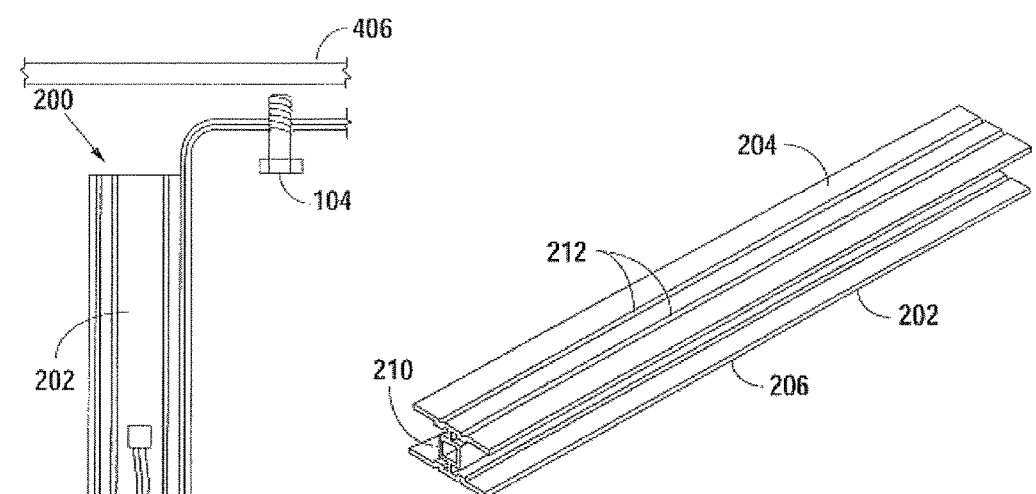
FIG. 8B is a cross sectional view of the extruded hollow LED module support structure shown in FIG. 8A.

The cross section of the extruded hollow LED module support structure 202 in the second embodiment 200 is that of a modified I-beam as shown in FIG. 8A and FIG. 8B which is cut substantially to the length of a linear fluorescent tube. Specifically, the modified I-beam includes a top flange 204, a bottom flange 206 and a web 208 therebetween. Formed in the web 208 is a substantially square central opening 210 that is large enough to encircle the protrusion in the middle of the interior of a fluorescent lamp socket 410. If desired, substantially V-shaped channels 212 may be formed on the outer sides of the top flange 204 and the bottom flange 206 for facilitating the drilling of holes or the insertion of self-threading fasteners.

Those of ordinary skill in the art will understand that ends of the extruded hollow LED module support structure 202 will enable the formation of mounting tabs 102A, 102B, and 102C as shown above in FIGS. 2, 2A, 2B and 2C by removing the structure between the flanges 204 and 206. Alternatively, the extruded hollow LED module support structure 202 may be attached to the raceway 406 using a three-sided connector 110 as shown in FIG. 2D. And, the extruded hollow LED module support structure 202 may engage the interior of the fluorescent lamp socket 410.

Figure 8C:
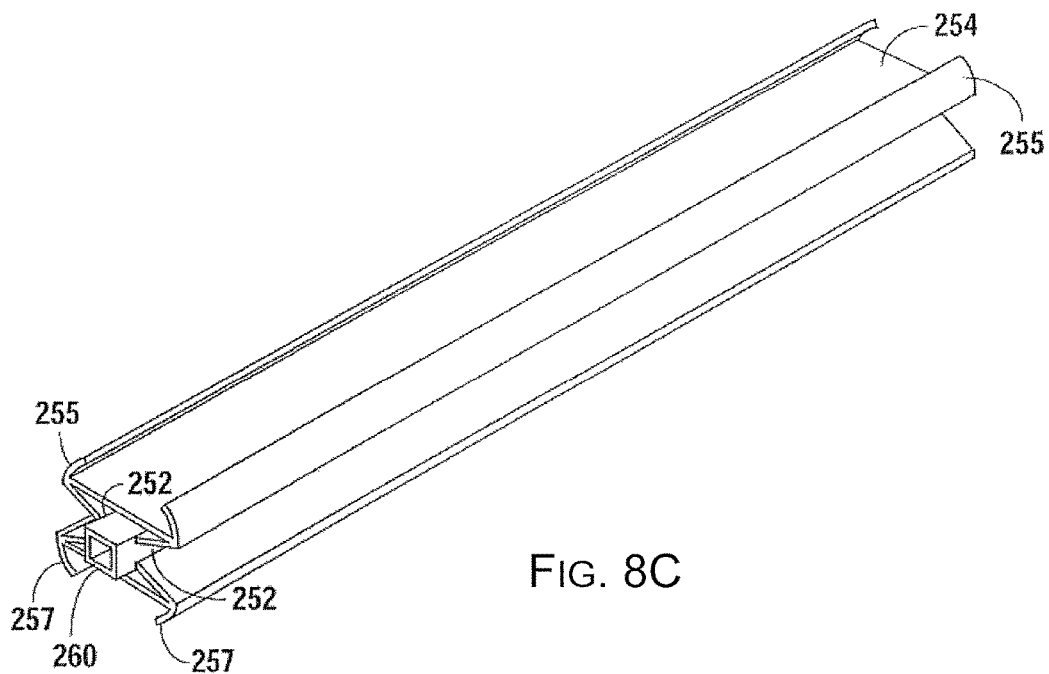
FIG. 8C is a perspective view of a second version of an extruded hollow LED module support structure.
Figure 8D:
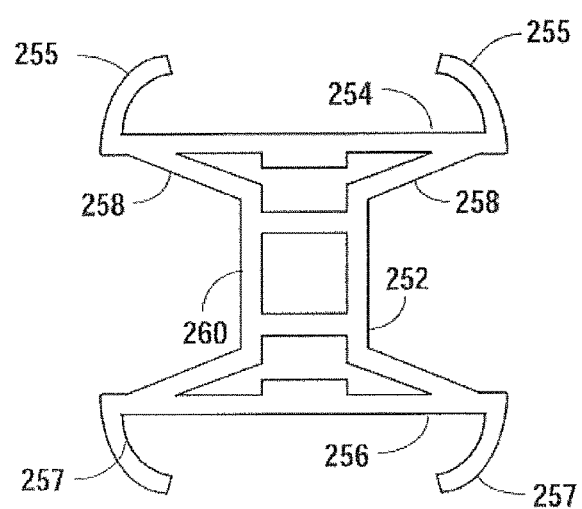
FIG. 8D is a cross-sectional view of the extruded hollow LED module support structure shown in FIG. 8C.

Shown in FIG. 8C is a perspective view of a second version of the extruded hollow LED module support structure 252 used in the second embodiment. A cross section appears in FIG. 8D. Herein the extruded LED module includes a top flange 254, a bottom flange 256 and a double web 258 therebetween. Formed in the double web 258 is a substantially square central opening 260 that is large enough to encircle the protrusion in the middle of the interior of the fluorescent lamp socket 410. On either side of the top flange 254 are quarter-arc LED module guides 255 for locating the LED module 500 on the top flange 254. Similar quarter-arc LED module guides 257 appear on either side of the bottom flange 256.

Figure 8E:
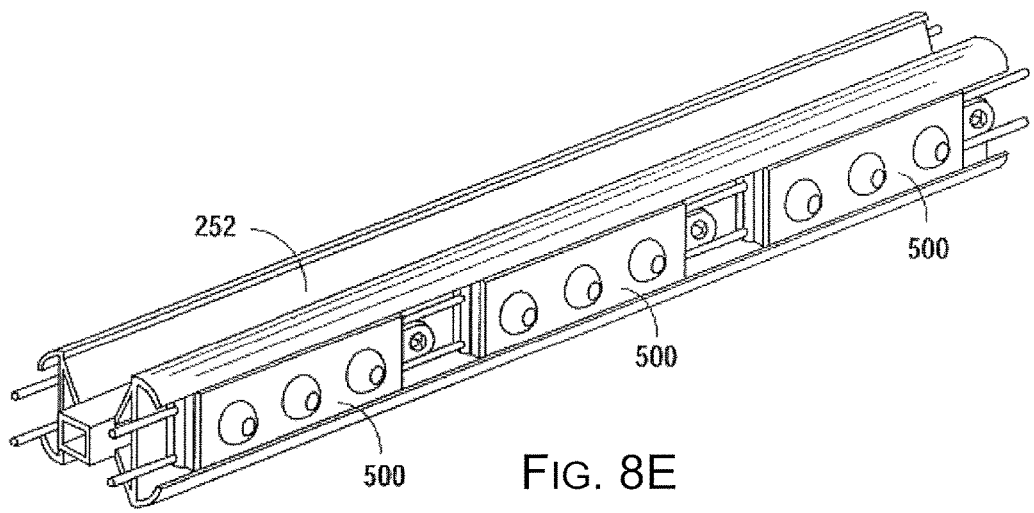
FIG. 8E is a perspective view of LED modules mounted on the extruded hollow LED module support structure shown in FIGS. 8C and 8D.

Shown in FIG. 8E is a plurality of LED modules 500 mounted to the flanges 254, 256 of extruded hollow module support structure 252 using threaded fasteners or adhesives.

As will be understood by those of ordinary skill in the art, the LED modules 500 are electrically connected one to another with wires.

Figure 8F:
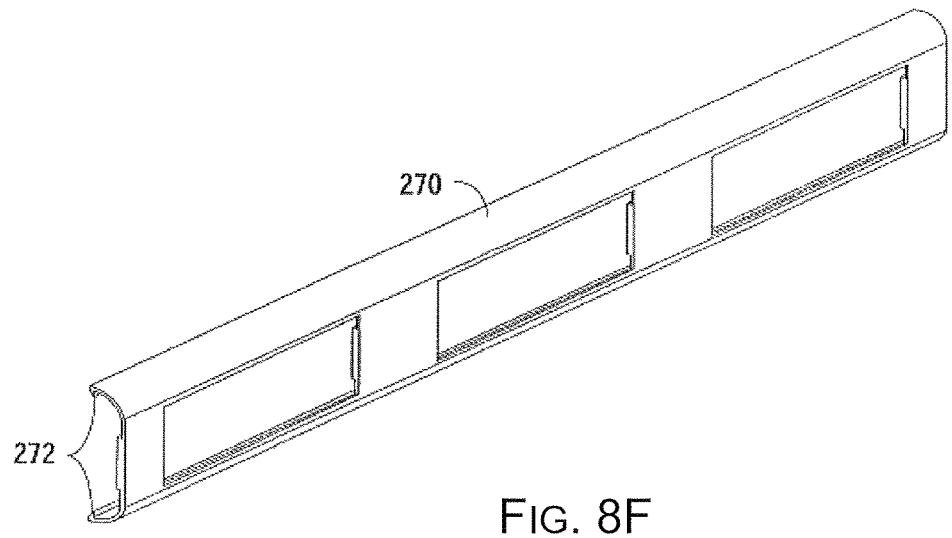
FIG. 8F is a perspective view of a cover which may be placed over the LED modules.
Figure 8G:
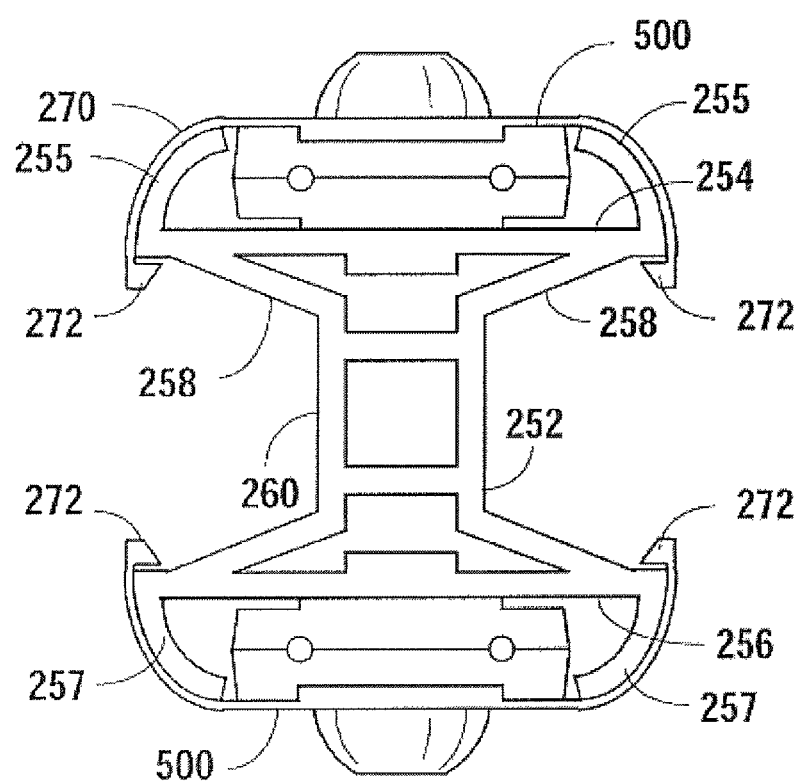
FIG. 8G is a cross sectional view similar to FIG. 8D with the cover snapped onto the extrusion over the LED module.

Shown in FIG. 8F is an optional custom cover extrusion 270 which may be placed over the extruded hollow LED module support structure 252 as shown in FIG. 8G. The optional custom cover extrusion 270 may be used to hold the LED modules 500 in place and cover the wires between the LED modules 500. The optional custom cover extrusion 270 is held in place by a snap fit 272 including a tab which snaps over the end of the flanges 254, 256 and comes to rest on the underside of the flanges 254 and 256.

When the extruded hollow LED module support structure 202, 252 is to be mounted to the raceway 406 of the prior art cabinet sign 400, as shown in FIG. 8, the mounting is similar to the mounting of the first embodiment 100. That is a top mounting tab and a bottom mounting using a three sided connector 110, as shown in FIG. 8 may be used.

Figure 9:
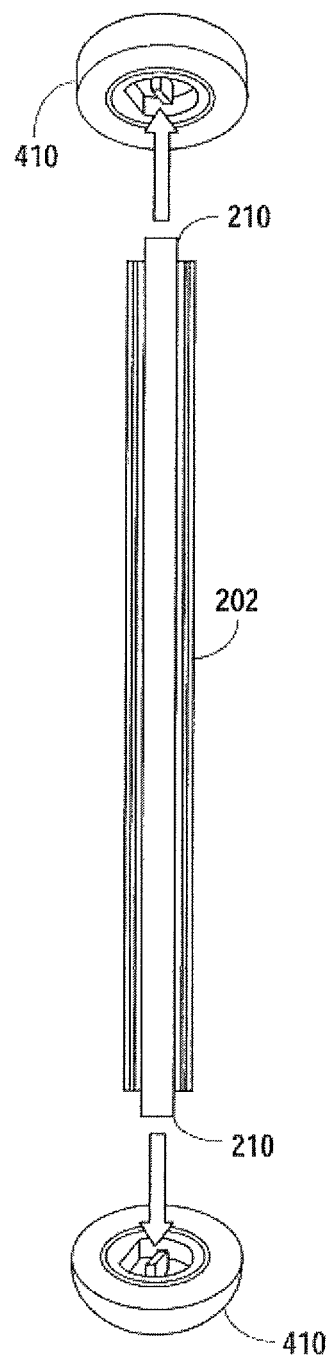
FIG. 9 is a side elevational view of the second embodiment with a portion of the flanges and web removed and placed between two fluorescent lamp sockets.

The presence of the substantially square central opening 210, 260 in the extruded hollow LED module support structure 202, 252 enables the extension of the substantially square central opening 210, 260 at the end of modified I-beam extruded hollow LED module support structure 202, 252 by removing portions of the flanges 204, 206, 254, 256 and a portion of the web 208, 258 as shown in FIG. 9. This substantially square central opening 210 may be used to encircle the protrusion in the interior of the fluorescent lamp socket 410. Thus, the ends of the extruded hollow LED module support structure 202, 252 may be affixed to a portion 407 (FIG. 1) of the raceway 406. Alternatively, the LED module support structure 202, 252 may be supported on either end by engagement with a fluorescent lamp socket 410 in the raceway 406.

As shown in FIG. 9, both ends of the modified I-beam extruded hollow LED module support structure 220 may be inserted into the interior of the fluorescent lamp sockets 410 if the installer elects to use the fluorescent lamp sockets 410 in the raceways 406 in the prior art cabinet sign 400.

Figure 10:
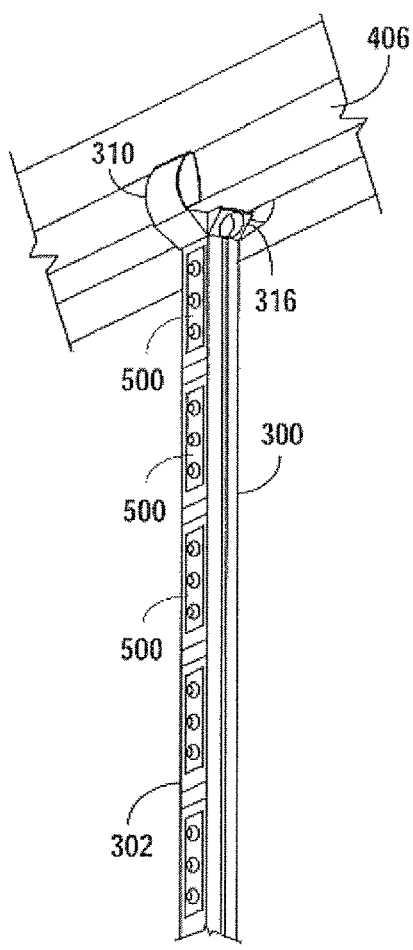
FIG. 10 is a perspective view of the third embodiment in connection with a raceway.
Figure 11:
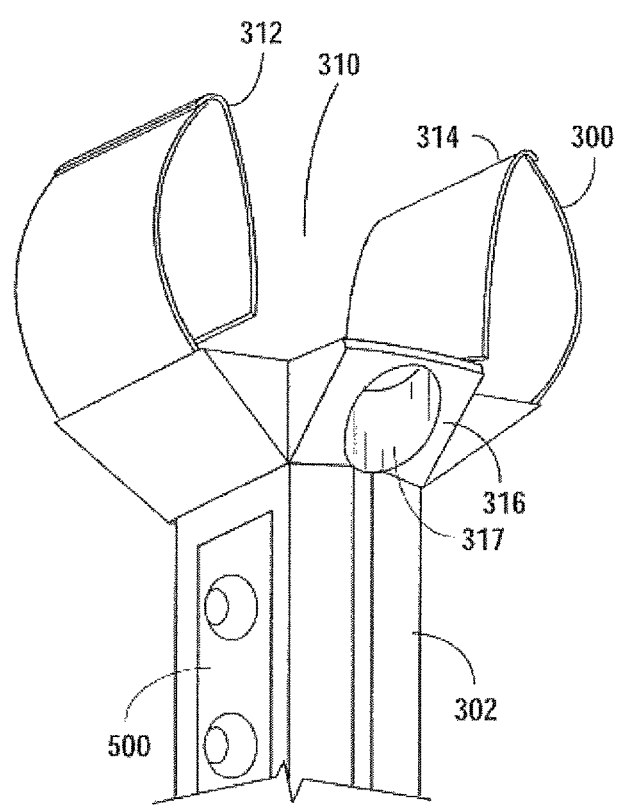
FIG. 11 is an enlarged view of the grappling yoke portion of the third embodiment.

In the third embodiment 300, shown in FIG. 10, yet another way of attaching an LED module support structure 302 to a raceway 406 is shown. As shown in FIG. 11, at the end of the LED module support structure 302 is a grappling yoke structure 310 which contacts the sides of the raceway 406 and is secured thereto with an overmolded plastic connector 316. A mounting hole 317 for use with a threaded fastener is formed on either side of the overmolded plastic connector 316.

As shown in FIG. 11, the grappling yoke structure 310 includes high coefficient of friction rubber pads 312, 314 which are mounted to that part of the grappling yoke structure 310 which contacts the sides of the raceway 406 as shown in FIG. 10. The grappling yoke structure 310 is designed so that it tends to close toward the raceway 406 when a downward force is placed on the LED module support structure 302.

As shown in FIG. 12, strips 303, 305 are inserted into the opening 322, 324 of a substantially H-shaped connector 320 and held in place by pairs of protrusions formed in the sides of the substantially H-shaped connector 320. The LED modules may be attached to the strips 303, 305, using clips 307. The combination of the two formed strips 322, 324 and the substantially H-shaped connector 320 may be formed into sections 302A, 302B.

As shown in FIG. 13, these sections 302A, 302B may be connected to one another using extenders 330. The extenders 330 as shown in FIG. 13A are formed to include a substantially circular protrusion 331 which engages a channel 340 formed in the outside of the substantially H-shaped connector 320.

The bottom of the LED module support structure 302 may be attached to the raceway 406 by forming mounting tabs 102A, 102B and 102C such as those shown in FIGS. 2, 2A, 2B and 2C.

While the disclosed retrofit system and method for replacing linear fluorescent lamps with LED modules have been disclosed according to preferred and alternate embodiments, those of ordinary skill in the art will understand that still other embodiments have been enabled according to the foregoing disclosure. Such other embodiments shall fall within the scope and meaning of the appended claims.

What is claimed is:

1. A system for replacing linear fluorescent lamps with light emitting diode (LED) modules in a cabinet sign, said cabinet sign being previously constructed and arranged for mounting linear fluorescent lamps in fluorescent lamp sockets, said system comprising:
   a) an extruded hollow LED module support structure having a first end and a second end, said extruded hollow LED module support structure being hollow from said first end to said second end, and wherein a cross section of said extruded hollow LED module support structure is a square;
   b) two or more LED modules mounted to one exterior side of said extruded hollow LED module support structure, wherein said two or more LED modules are mounted using at least one of an adhesive or one or more threaded fasteners;
   c) wires for electrically connecting said two or more LED modules one to another, said wires being positioned between each of said two or more LED modules such that said wires exit from an end of a first of said two or more LED modules and enter an opposing end of a second of said two or more LED modules, wherein said wires provide electrical energy to said two or more LED modules;
   d) each of said two or more LED modules comprising:
      1) a LED module housing with one or more LEDs, said LED module housing comprising two openings positioned on each end of said LED module housing, wherein said wires enter said LED module housing through said two openings;
      2) a lens positioned over each of said one or more LEDs; and
      3) at least one mounting hole for receiving said one or more threaded fasteners; and
   e) each of said first end and said second end of said extruded hollow LED module support structure having an opening therein, said opening comprising a square central opening, wherein said square central opening is sized to fit around a protrusion within an interior portion of the fluorescent lamp sockets, thereby enabling said extruded hollow LED module support structure to be supported by the fluorescent lamp sockets within the cabinet sign.

2. The system as defined in claim 1 wherein said LED module housing comprises a top portion and a bottom portion, and wherein said top portion and said bottom portion are discrete components of said LED module housing.

3. The system as defined in claim 1 wherein each of said two or more LED modules are spaced apart from one another when operatively mounted on said extruded hollow LED module support structure such that each of said two or more LED modules do not make physical contact with any other of said two or more LED modules.

4. The system as defined in claim 1 wherein the lateral edges of each of said two or more LED modules laterally extend beyond the lateral edges of the hollow portion of said extruded hollow LED module support structure.

5. The system as defined in claim 1 wherein each of said two or more LED modules includes three LEDs.

6. The system as defined in claim 5 wherein said three LEDs are linearly positioned along the longitudinal axis of each of said two or more LED modules.

7. The system as defined in claim 1 wherein said LED module housing comprises a rigid LED module housing.

8. The system as defined in claim 1 wherein at least two sides of said extruded hollow LED module support structure have two or more LED modules mounted thereon.

9. A system for replacing linear fluorescent lamps with light emitting diode (LED) modules in a cabinet sign, said cabinet sign being previously constructed and arranged for mounting linear fluorescent lamps in fluorescent lamp sockets, said system comprising:
 a) an extruded hollow LED module support structure having a first end and a second end, said extruded hollow LED module support structure being hollow from said first end to said second end;
 b) two or more LED modules mounted to at least two sides of said extruded hollow LED module support structure, each of said LED modules comprising an LED module housing with one or more LEDs;
 c) wires for electrically connecting said two or more LED modules one to another, wherein said wires provide electrical energy to said two or more LED modules;
 d) each of said first end and said second end of said extruded hollow LED module support structure having a central opening therein, wherein said central opening enables an engagement of said extruded hollow LED module support structure with the fluorescent lamp sockets;
 e) said extruded hollow LED module support structure having a square cross section;
 f) said two or more LED modules being mounted to said at least two sides of said extruded hollow LED module support structure using at least one of an adhesive or one or more threaded fasteners;
 g) each of said two or more LED modules further comprising:
  1) at least one mounting hole for receiving said one or more threaded fasteners; and
  2) one or more lenses positioned over said one or more LEDs;
 h) said wires being positioned between each of said two or more LED modules such that said wires exit from an end of a first of said two or more LED modules and enter an opposing end of a second of said two or more LED modules thereby electrically connecting said two or more LED modules one to another;
 i) said LED module housing comprising a top portion, a bottom portion, and two openings positioned on each end of each of said two or more LED modules between said top portion and said bottom portion, wherein said wires enter said LED module housing through said two openings; and
 j) wherein said top portion and said bottom portion are discrete components of said LED module housing.

10. The system as defined in claim 9 wherein said central opening in each of said first end and said second end of said extruded hollow LED module support structure is a square central opening that is sized to fit around a protrusion within an interior portion of the fluorescent lamp socket, thereby enabling said engagement of said extruded hollow LED module support structure with the fluorescent lamp sockets, such that said extruded hollow LED module support structure is supported by the fluorescent lamp sockets within the cabinet sign.

11. The system as defined in claim 9 wherein said two or more LED modules do not make physical contact with one another when operatively mounted to said one side of said extruded hollow LED module support structure.

12. The system as defined in claim 9 wherein the lateral edges of each of said two or more LED modules laterally extend beyond the lateral edges of the hollow portion of said extruded hollow LED module support structure.

13. The system as defined in claim 9 wherein said two or more LED modules are mounted on two sides of said extruded hollow LED module support structure.

14. The system as defined in claim 9 wherein each of said two or more LED modules includes three LEDs.

15. The system as defined in claim 14 wherein said three LEDs are linearly positioned along the longitudinal axis of each of said two or more LED modules.

16. A system for replacing linear fluorescent lamps with light emitting diode (LED) modules in a cabinet sign, said cabinet sign being previously constructed and arranged for mounting linear fluorescent lamps in fluorescent lamp sockets, said system comprising:
 a) an extruded hollow LED module support structure having a first end and a second end, said extruded hollow LED module support structure being hollow from said first end to said second end;
 b) two or more LED modules mounted to at least two sides of said extruded hollow LED module support structure, wherein each of said two or more LED modules comprises a LED module housing with one or more LEDs;
 c) wires for electrically connecting said two or more LED modules one to another, said wires providing electrical energy to said two or more LED modules;
 d) each of said first end and said second end of said extruded hollow LED module support structure having a square central opening therein, wherein said square central opening enables an engagement of said extruded hollow LED module support structure with the fluorescent lamp sockets;
 e) said extruded hollow LED module support structure having a rectangular cross section;
 f) said two or more LED modules being mounted to said at least two sides of said extruded hollow LED module support structure using at least one of an adhesive or one or more threaded fasteners;
 g) wherein each of said two or more LED modules further comprises:
  i) at least one mounting hole for receiving said one or more threaded fasteners; and
  ii) a lens positioned over each of said one or more LEDs; and
 h) each of said two or more LED modules further comprising two openings positioned on each end of said LED module housing, wherein said wires enter said LED module housing through said two openings.

17. The system as defined in claim 16 wherein said wires are positioned between each of said two or more LED modules such that said wires exit from an end of a first of said two or more LED modules and enter an opposing end of a second of said two or more LED modules, thereby electrically connecting said two or more LED modules one to another.

18. The system as defined in claim 16 wherein said LED module housing comprises a rigid LED module housing.

19. The system as defined in claim 16 wherein said square central opening in each of said first end and said second end of said extruded hollow LED module support structure is sized to fit around a protrusion within an interior portion of the fluorescent lamp socket, thereby enabling said engagement of said extruded hollow LED module support structure with the fluorescent lamp sockets, such that said extruded hollow LED module support structure is supported by the fluorescent lamp sockets within the cabinet sign.

20. The system as defined in claim 16 wherein each of said two or more LED modules includes three LEDs.

\* \* \* \* \*